Nov. 18, 1924.
F. HEATH
1,516,011
PRESSURE CONTROLLED VALVE
Filed Jan. 26, 1923   2 Sheets-Sheet 1
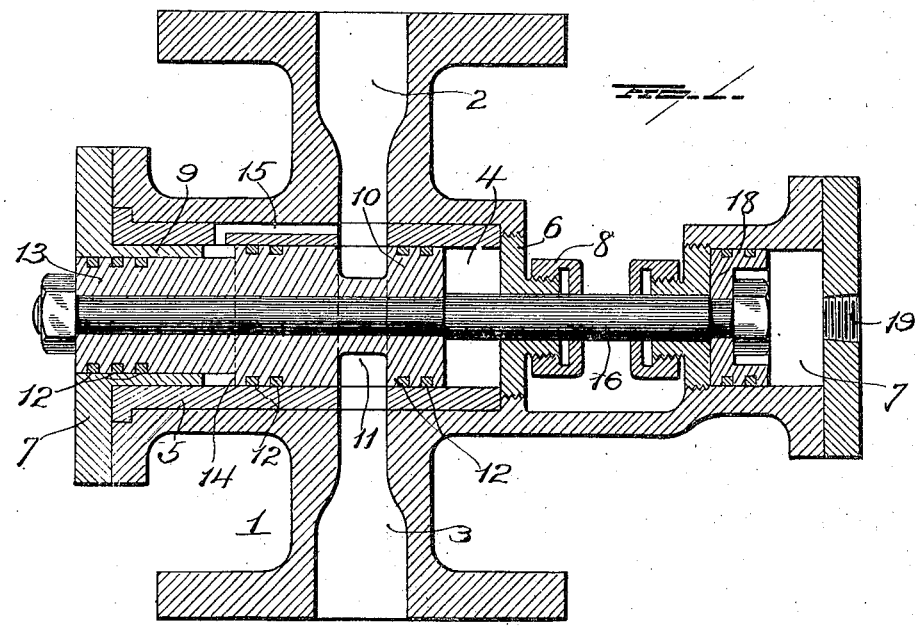
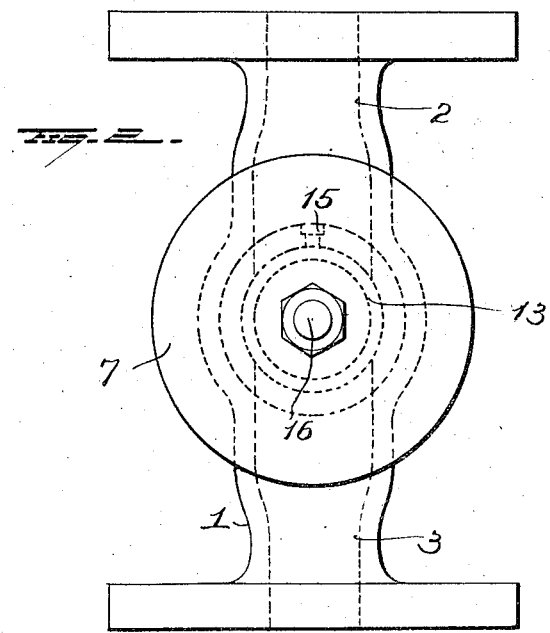
Inventor
F. Heath
By Seymour & Bright
Attorneys

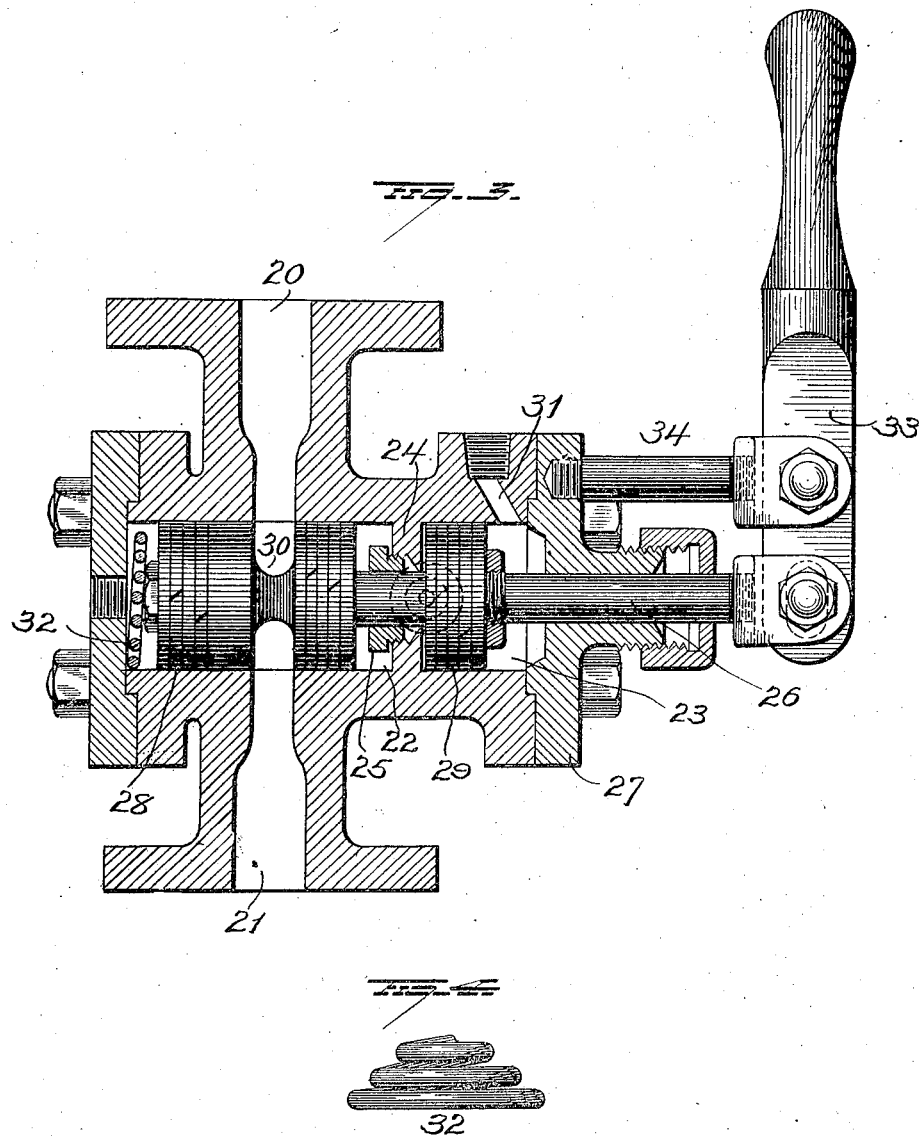

Patented Nov. 18, 1924.

1,516,011

UNITED STATES PATENT OFFICE.

FREDERICK HEATH, OF BELLINGHAM, WASHINGTON.

PRESSURE-CONTROLLED VALVE.

Application filed January 26, 1923. Serial No. 615,123.

*To all whom it may concern:*

Be it known that I, FREDERICK HEATH, a citizen of the United States, and a resident of Bellingham, in the county of Whatcom and State of Washington, have invented certain new and useful Improvements in Pressure-Controlled Valves; and I do hereby declare the following to be a full, clear, and exact description of the invention, such as will enable others skilled in the art to which it appertains to make and use the same.

My present invention relates to pressure-controlled valves and has particular reference to that type of valves which are normally open to permit flow of a motive fluid to a pump or other working element and which automatically closes upon reduction of pressure in the main line of the system in which the valve is employed. My improved valve is designed especially for use in the pipe supplying steam to a pump which feeds oil to an oil burner, and is connected with the oil-delivery line so that upon reduction of pressure in said line the valve will close and cut off the steam, but the valve is useful in other fields.

The invention is illustrated in the accompanying drawings, in which—

Figure 1 is a longitudinal section of one form of the valve;

Figure 2 is an end elevation of the same;

Figure 3 is a longitudinal section of another form of the valve;

Figure 4 is a detail elevation of the spring shown in Figure 3.

In the drawings, the reference numeral 1 indicates a valve casing having an inlet port 2 and an outlet port 3 in communication with a cylindrical chamber 4 which may be provided with a lining 5 as shown, the ports, of course, extending through the lining. The opposite ends of the cylinder or chamber 4 are closed by heads 6 and 7, the head 6 carrying a gland 8 and the head 7 having a central opening and being provided on one face with a ring or collar 9 adapted to fit closely within the end of the cylinder or of the lining, as shown. Snugly but slidably fitted in the cylinder, or the lining as the case may be, is a piston 10 constructed with an external annular groove 11 between its ends adapted to establish communication between the inlet and outlet whereby in the normal open position of the valve the steam may flow uninterruptedly through the casing to the pump or engine. The piston is, of course, provided with suitable packing rings 12 to prevent leakage, and one end 13, of the piston is reduced and fits in the collar or ring 9 and the central opening of the head 7, an annular shoulder 14 being thereby formed on the piston which is normally spaced from the end of the ring or collar, as clearly shown. In the lining or the wall of the cylinder is a by-pass 15 leading from the inlet 2 to the space between the shoulder 14 and the end of the ring or collar 9. The piston is fixed upon a piston rod 16 which extends through and beyond the head 6 and gland 8 and into a secondary cylinder or pressure chamber 17, a piston 18 being secured upon the rod within said chamber. Said chamber 17 is closed except for an opening 19 in which is secured the end of a pipe (not shown) connected with the line carrying oil under pressure to the burner.

The normal working position of the valve is shown in Fig. 1, steam flowing through the port 2, the groove 11, and the port 3 to and into the steam line. The pressure of the steam upon the two walls of the groove will be balanced so that the valve is not influenced in either direction thereby. Some steam flows through the by-pass 15 and acts upon the shoulder 14, tending to move the piston across the ports 2 and 3. Oil is, however, admitted to the chamber 17 from the oil-delivery line and acting upon the greater area of the piston 18 resists and overcomes the pressure upon the shoulder 14 so that as long as conditions are normal in the oil-delivery line the valve will remain in the working position shown in Fig. 1. Should the pressure in said line drop, there will be a like reduction in the chamber 17 so that the pressure upon the shoulder 14 will be dominant and at once move the piston across the inlet port and cut off the flow of steam.

In the form of the invention shown in Fig. 3, the valve casing has an inlet port 20 and an outlet port 21 which communicate with a cylinder 22 and a secondary cylinder 23 is formed in the valve casing in axial alinement with the cylinder 22, being separated therefrom by a web 24 in which a gland 25 is fitted. The piston rod 26 extends through the gland 25 and through a head 27 which closes the outer end of the secondary cylinder 23, and carries a piston 28 within the cylinder 22 and a piston 29 within the cylinder 23. An annular groove 30 in the piston 28 establishes communication between the ports 20 and 21 and a port 31 admits the oil or other liquid under pressure to the cylinder 23 at the outer side of the piston 29. The by-pass 15 of Fig. 1 is omitted and a conical coiled spring 32 is arranged between the piston 28 and the adjacent end of the cylinder to act on the piston in opposition to the liquid pressure in the cylinder 23. The outer end of the piston rod is pivotally attached to a hand lever 33 which is fulcrumed upon a post or bracket 34 projecting from the cylinder head 27.

If so desired, a pet cock may be fitted in the side of the valve casing at the inner end of the cylinder 23, as indicated by dotted lines. A pet cock may also be fitted in the outer end of the main cylinder 22.

The normal working position is illustrated, the pressure upon the piston 29 being balanced by the force of the spring 32 so that the piston 28 remains in the open position with uninterrupted communication between the ports 20 and 21. Should the pressure in the oil line drop, the pressure upon the piston 29 will be reduced whereupon the spring 32 will expand and throw the piston across the several ports and cut off the flow. When normal conditions in the oil line have been restored, the lever 33 is rocked to return the piston to its normal position and permit the apparatus to resume operation.

Having fully described my invention what I claim as new and desire to secure by Letters-Patent, is:—

1. The combination of a valve casing comprising a cylinder having closed ends and provided between its ends with ports constituting an inlet and an outlet in the same radial plane of the cylinder, a pressure chamber alined axially with the cylinder and provided with a port to establish communication with a pressure line, a piston in the cylinder having a circumferential groove normally establishing communication between the inlet and the outlet, a piston in the pressure chamber exposed at its outer side to the pressure therein, the inner wall of the pressure chamber constituting a stop to limit the movement of the piston under pressure, a rigid connection between the piston in the pressure chamber and the piston in the cylinder maintaining the pistons in fixed relation, and means in the cylinder whereby pressure is constantly exerted on the piston therein in opposition to the pressure in the pressure chamber to cut off communication between the inlet and the outlet upon reduction of the pressure in the pressure chamber.

2. The combination of a valve casing comprising a cylinder having closed ends and provided between its ends with ports constituting an inlet and an outlet in the same radial plane of the cylinder, a pressure chamber alined axially with the cylinder and provided with a port to establish communication with a pressure line, a piston in the cylinder having a circumferential groove normally establishing communication between the inlet and the outlet, a piston in the pressure chamber exposed at its outer side to the pressure therein, the inner wall of the pressure chamber constituting a stop to limit the movement of the piston under pressure, a rigid connection between the piston in the pressure chamber and the piston in the cylinder maintaining the pistons in fixed relation, and means in the cylinder whereby pressure is constantly exerted on the piston therein in opposition to the pressure in the pressure chamber to cut off communication between the inlet and the outlet upon reduction of the pressure in the pressure chamber, a lever mounted upon the pressure chamber, and a connection between the lever and the piston in the pressure chamber whereby to set the parts in the working position.

In testimony whereof, I have signed this specification in the presence of two subscribing witnesses.

FREDERICK HEATH.

Witnesses:
BERTON WALDRON HUNTOON,
HENRY BAILEY DRISKO.